United States Patent
Alexander et al.

(10) Patent No.: US 11,192,536 B1
(45) Date of Patent: Dec. 7, 2021

(54) BRAKE TORQUE DISTRIBUTION SYSTEM USING ALL-WHEEL-DRIVE MODE OF POWERTRAIN, VEHICLE INCLUDING SAME, AND METHOD

(71) Applicant: Honda Motor Co., Ltd., Tokyo (JP)

(72) Inventors: Aaron R. Alexander, Sunbury, OH (US); Michael J. Dutt, Butler, NJ (US); Dasarathi Gedela, Dublin, OH (US); Nathan J. Rutter, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/934,425

(22) Filed: Jul. 21, 2020

(51) Int. Cl.
*B60W 10/119* (2012.01)
*B60W 10/18* (2012.01)
(Continued)

(52) U.S. Cl.
CPC .......... *B60W 10/119* (2013.01); *B60K 17/02* (2013.01); *B60K 17/34* (2013.01); *B60T 7/12* (2013.01); *B60T 8/24* (2013.01); *B60W 10/196* (2013.01); *F16D 48/06* (2013.01); *B60T 2260/09* (2013.01); *B60W 2510/1005* (2013.01); *B60W 2520/10* (2013.01); *B60W 2530/10* (2013.01); *B60W 2552/15* (2020.02); *B60W 2710/021* (2013.01);
(Continued)

(58) Field of Classification Search
CPC ............ B60W 10/119; B60W 10/184; B60W 10/196; B60W 10/18; B60W 10/14; B60W 2552/15; B60W 2510/1005; B60W 2520/10; B60W 2530/10; B60W 2710/021; B60W 2710/18; B60W 30/02; B60W 30/18036; B60W 30/18109; B60K 17/02; B60K 17/34; B60T 7/12; B60T 8/24; B60T 2260/09; F16D 48/06; F16D 2500/10431; F16D 2500/30401
See application file for complete search history.

(56) References Cited

U.S. PATENT DOCUMENTS

| 5,088,355 A | 2/1992 | Sugaya et al. |
| 6,076,898 A * | 6/2000 | Ota .................. B60T 7/122 303/139 |

(Continued)

FOREIGN PATENT DOCUMENTS

| DE | 102009001798 A1 | 9/2010 |
| DE | 102012019488 A1 | 4/2013 |
| FR | 2995858 A1 | 3/2014 |

*Primary Examiner* — Edwin A Young
(74) *Attorney, Agent, or Firm* — Kenealy Vaidya LLP

(57) ABSTRACT

A brake torque distribution system for a vehicle can include a braking system and a controller. The controller can be configured to signal a clutch of the vehicle powertrain to move to the engaged position such that the front wheels are rotationally coupled to the rear wheels and the brake torque applied to the front wheels by the braking system is transmitted to the rear wheels. The controller can be configured to signal the clutch to move to the engaged position based on an inclination angle signal received by the controller and indicative of an angle of inclination of the vehicle, a selected gear signal received by the controller that is indicative of the reverse gear ratio being selected in the powertrain, and a load signal received by the controller and indicative of a load applied to a portion of the vehicle adjacent to the rear wheels.

20 Claims, 2 Drawing Sheets

(51) Int. Cl.
*B60K 17/34* (2006.01)
*B60T 7/12* (2006.01)
*B60W 10/196* (2012.01)
*B60T 8/24* (2006.01)
*F16D 48/06* (2006.01)
*B60K 17/02* (2006.01)

(52) U.S. Cl.
CPC .................... *B60W 2710/18* (2013.01); *F16D 2500/10431* (2013.01); *F16D 2500/30401* (2013.01)

(56) References Cited

U.S. PATENT DOCUMENTS

| | | |
|---|---|---|
| 6,591,179 B1 | 7/2003 | Check et al. |
| 6,875,153 B2 * | 4/2005 | Jager ...................... B60W 10/11 477/71 |
| 8,092,340 B2 | 1/2012 | Song et al. |
| 2002/0145333 A1 | 10/2002 | Faye |
| 2015/0203117 A1 * | 7/2015 | Kelly .................. B60W 30/143 701/91 |
| 2016/0185216 A1 * | 6/2016 | Clarke .................. B60K 17/35 74/665 F |
| 2017/0232944 A1 * | 8/2017 | Owen ...................... B60T 8/171 701/94 |
| 2018/0312063 A1 | 11/2018 | Woopen et al. |

* cited by examiner

BRAKE TORQUE DISTRIBUTION SYSTEM USING ALL-WHEEL-DRIVE MODE OF POWERTRAIN, VEHICLE INCLUDING SAME, AND METHOD

BACKGROUND

The disclosed subject matter relates to an apparatus for distributing a brake torque to the wheels of a vehicle. More particularly, the disclosed subject matter relates to methods and apparatus that use an all-wheel-drive mode of a vehicle powertrain to distribute a braking torque applied by a braking system to each of the wheels of the vehicle.

A vehicle drivetrain can be configured as either a two-wheel-drive powertrain (e.g., front-wheel drive or rear-wheel-drive) or a four-wheel-drive powertrain (e.g., part-time or full-time). In a part-time, four-wheel-drive configuration, the vehicle drivetrain can operate primarily in a two-wheel-drive configuration and the vehicle is propelled by primary drive wheels (e.g., front wheels) and the secondary drive wheels (e.g., rear wheels) are selectively engaged to a power source to improve tractive effort as conditions warrant. The secondary drive wheels can be disengaged from the power source to maximize fuel efficiency in conditions where two-wheel-drive propulsion is sufficient. Engagement/disengagement of the secondary drive wheels can be initiated by the vehicle operator through a mechanical linkage or via an electrical switch and electro-mechanical actuator assembly. Alternatively, a passive hydro-mechanical system can be utilized. Another alternate approach to engage/disengage the secondary drive wheels can employ an electronic control unit (ECU) to engage/disengage the secondary drive wheels via an actuator assembly in electrical communication with the ECU.

Certain four-wheel-drive vehicles, such as sports-utility vehicles (SUVs) and pick-ups, can be used for transporting a relatively heavy load stowed in an internal cargo space, stowed in an external cargo space such as a pick-up bed, and/or stowed in or carried on a trailer hitched to the vehicle. The weight of the vehicle and the load can be distributed to the wheels of the vehicle via the suspension system. For example, the front wheels can support 45% of the total vehicle weight and the rear wheels can support 55% of the total vehicle weight when the vehicle is unoccupied and empty. A load stowed in a rear cargo space of the vehicle or trailer hitched to the vehicle can shift a greater percentage of the total weight of the vehicle and the load as compared to the empty state of the vehicle.

SUMMARY

Some embodiments are directed to a brake torque distribution system for a vehicle having a pair of front wheels, a pair of rear wheels, and a powertrain configured to selectively drive either the front wheels or the rear wheels in a two-wheel drive mode and selectively drive all of the front wheels and the rear wheels in an all-wheel drive mode. The powertrain can include a reverse gear and a clutch having an engaged position and a disengaged position. The powertrain can operate in the two-wheel drive mode when the clutch is in the disengaged position and operating in the all-wheel drive mode when the clutch is in the engaged position. The brake torque distribution system can include a braking system and a controller. The braking system can be configured to selectively apply a braking torque to each of the front wheels and the rear wheels that decelerates rotation of the front wheels and the rear wheels in response to a braking request received by the braking system. The controller can be in electrical communication with the braking system and the clutch, and configured to signal the clutch to move to the engaged position such that the front wheels are rotationally coupled to the rear wheels and the brake torque applied to the front wheels by the braking system is transmitted to the rear wheels. The controller can be configured to signal the clutch to move to the engaged position based on an inclination angle signal received by the controller and indicative of an angle of inclination of the vehicle, a selected gear signal received by the controller that is indicative of the reverse gear ratio being selected in the powertrain, and a load signal received by the controller and indicative of a load applied to a portion of the vehicle adjacent to the rear wheels.

Some embodiments are directed to a vehicle that can include a pair of front wheels, a pair of rear wheels, a powertrain, a braking system, and a controller. The powertrain can be configured to selectively drive either the front wheels or the rear wheels in a two-wheel drive mode and selectively drive all of the front wheels and the rear wheels in an all-wheel drive mode. The powertrain can include a clutch having a disengaged position and an engaged position. The powertrain can operate in the two-wheel drive mode when the clutch is in the disengaged position and in the all-wheel drive mode when the clutch is in the engaged position. The braking system can be connected to each of the front wheels and the rear wheels and configured to selectively apply a first braking torque to each of the front wheels and a second braking torque to each of the rear wheels such that braking system decelerates the front wheels and the rear wheels when the braking system applies the first braking torque to the front wheels and the second braking torque to the rear wheels. The controller can be configured to signal the clutch to move to the engaged position in response to the vehicle reversing down an incline and the braking system applying the first braking torque to the front wheels and the second braking torque to the rear wheels such that the clutch rotationally couples the pair of rear wheels to the pair of front wheels and transmits to the rear wheels the first braking torque.

Some embodiments are directed to a method for using an all-wheel drive mode of a powertrain for a vehicle to distribute a braking torque applied by a braking system of the vehicle. The vehicle powertrain can include a clutch configured to selectively activate and deactivate the all-wheel drive mode. The method can include: obtaining an inclination angle of the vehicle and a direction of travel of the vehicle; determining whether a load is applied to a portion of the vehicle that is adjacent to a rear wheel of the vehicle; and signaling the clutch to activate the all-wheel drive mode when the vehicle is reversing down an incline and the load is equal to or greater than a predetermined load threshold.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
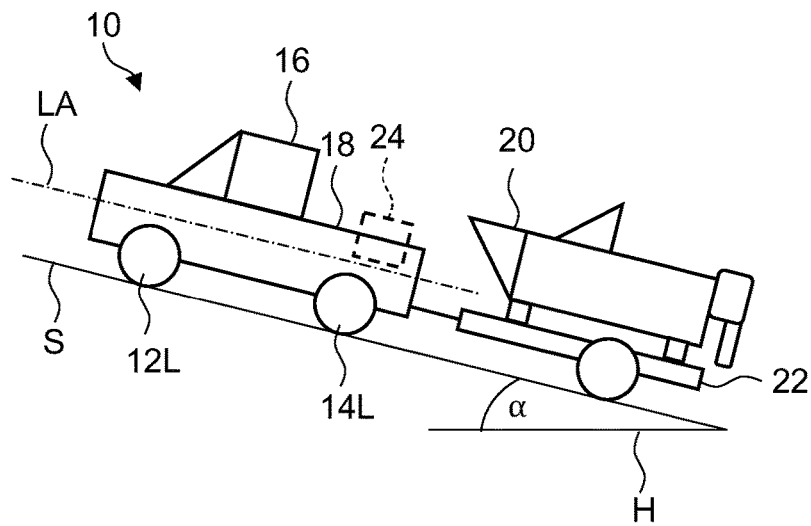
FIG. 1 is a schematic view of a vehicle with a trailer carrying a load and reversing down an inclined surface.
Figure 2:
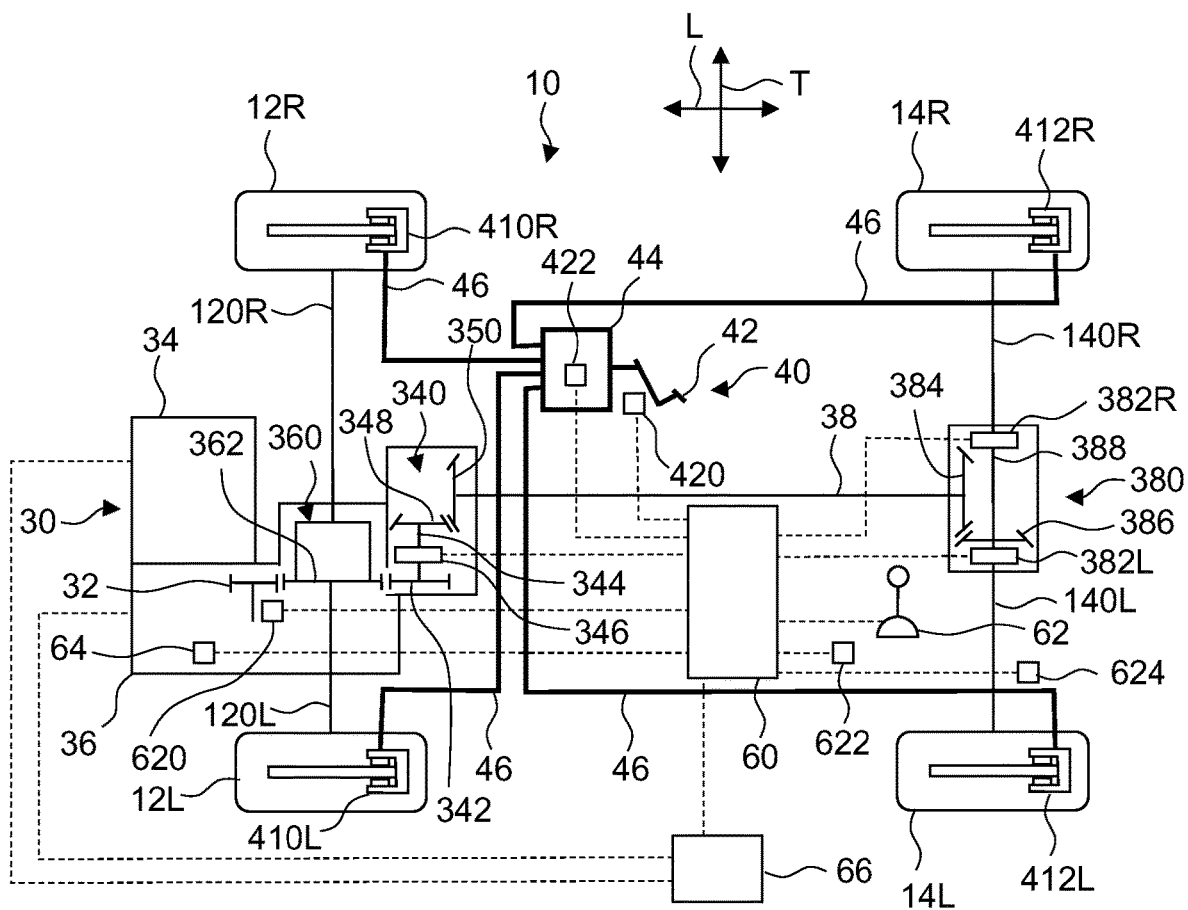
FIG. 2 is a schematic view of the vehicle of FIG. 1 including brake torque distribution system made in accordance with principles of the disclosed subject matter.

FIG. 1 illustrates a vehicle 10 with a load 20 in the form of a trailer 22 reversing down a travel surface S that is inclined at an angle α with respect to horizontal H. Alternatively, or in addition to the load 20 in the form of the trailer 22, the load 20 can be in the form of at least one article 24 (shown in phantom) that is stowed in the cargo space 18. Referring to FIGS. 1 and 2 collectively, the vehicle 10 can include a pair of front wheels 12L, 12R, a pair of rear wheels 14L, 14R, a main body 16, a pair of front driveshafts 120L, 120R and a pair of rear driveshafts 140L, 140R.

The front wheels 12L, 12R and the front driveshafts 120L, 120R can be collectively referred to as a front axle. The rear wheels 14L, 14R and the rear driveshafts 140L, 140R can be collectively referred to as a rear axle.

The main body 16 can include a passenger compartment, a plurality of operator input components and a cargo space 18. The passenger compartment can be fully enclosed (for example, as with a truck, sport-utility vehicle, sedan, tractor, etc.) or partially enclosed (for example, as with a convertible, a roadster, an All-Terrain Vehicle, a motorcycle, a tractor, a golf cart, etc.). The cargo space 18 can be located adjacent to the rear wheels 14L, 14R and can be an interior space or an exterior space. FIG. 1 illustrates the cargo space 18 as an external cargo space.

Referring to FIG. 2, the vehicle 10 can include a powertrain 30 and a braking system 40.

The powertrain 30 can be configured to propel the vehicle 10 along the travel surface S by driving at least a pair of the wheels 12L, 12R, 14L, 14R. For example, the powertrain 30 can be configured to operate in a two-wheel-drive ("2WD") mode in which either the pair of front wheels 12L, 12R are driven or the pair of rear wheels 14L, 14R are driven. The powertrain 30 can be configured to selectively switch from the 2WD mode to a four-wheel-drive ("4WD") mode in which all four of the wheels 12L, 12R, 14L, 14R are driven. Further details of the powertrain 30 and the 2WD and 4WD modes will be described below.

The braking system 40 can be configured to slow and/or stop the travel of the vehicle 10 along the travel surface S. When the vehicle 10 travels in a forward direction and the braking system 40 is activated to apply a braking torque to the wheels 12L 12R, 14L, 14R, a greater percentage of the vehicle weight can shift to the front axle as compared to the rear axle. Thus, the frictional force between the travel surface S and the front wheels 12L, 12R can be greater than the frictional force between the travel surface and the rear wheels 14L, 14R. The braking system 40 can be advantageously configured with a front brake bias that applies a braking torque to the front wheels 12L, 12R that is greater than a braking torque that the braking system 40 applies to the rear wheels 14L, 14R so that the braking system 40 can take advantage of the greater friction between the front wheels 12L, 12R and the travel surface S. The front brake bias of the braking system 40 can reduce the distance the vehicle 10 travels before slowing to the desired speed or coming to a complete stop as compared to a neutral bias or a rear brake bias.

Referring to FIG. 1, the load 20 can shift the weight distribution such that the rear axle supports a percentage of the combined weight of the vehicle 10 and the load 20 that is greater than the percentage of the combined weight that the front axle supports. At relative low speeds, such as those encountered when reversing the trailer 22 down a boat ramp, the weight shift described above due to activation of the braking system 40 can be negligible. However, the shift in weight distribution due to the load 20 can reduce the friction between the front wheels 12L, 12R and the travel surface as compared to the friction between the rear wheels 14L, 14R and the travel surface S. As a result of the front brake bias and the shift in the weight distribution, it is possible that the braking system 40 can lock the front wheels 12L, 12R against rotation while the rear wheels 14L, 14R continue to rotate. Thus, the operator might perceive the steering performance and braking performance of the vehicle 10 to not correspond to the operator's requested steering and braking performance.

The vehicle 10 can include a brake torque distribution system in accordance with the principles of the disclosed subject matter that can enhance the operator's perception of the steering and braking performance of the vehicle 10. The brake torque system can include the powertrain 30 and the braking system 40. The brake torque distribution system can be configured to automatically and effectively adjust the brake bias to the rear wheels 14L, 14R when the vehicle 10 travels in reverse down the travel surface S that is inclined. Further, the brake torque distribution system can be configured to automatically return the brake bias to the front wheels 12L, 12R when the vehicle 10 is no longer reversing down the inclined travel surface S. The brake torque distribution system can utilize components of the powertrain 30 and the braking system 40 without adding components or systems that are exclusive to the brake torque distribution system.

When reversing down the inclined travel surface S, it is possible that the powertrain 30 does not input a drive torque to the wheels 12L, 12R, 14L, 14R. Instead, the operator of the vehicle 10 can rely on gravity and the braking system 40 to modulate the speed of the vehicle 10 by increasing or decreasing the brake torque applied to the wheels 12L, 12R, 14L, 14R. In this state, the brake torque distribution system can be configured to actuate the 4WD mode of the powertrain 30. The 4WD mode can rotationally couple the rear wheels 14L, 14R to the front wheels 12L, 12R such that the rear wheels 14L, 14R can provide an input torque to the front wheels 12L, 12R when the vehicle 10 travels backward down the inclined surface S.

If the torque input by the rear wheels 14L, 14R is greater than the braking torque applied to the front wheels 12L, 12R, then the operator's requested braking torque can correspond to a value at which the vehicle 10 will continue down the inclined surface S. In this state, the drive torque input to the powertrain 30 by the rear wheels 14L, 14R can overcome the braking torque applied to the front wheels 12L, 12R such that the front wheels 12L, 12R can maintain rolling traction with the inclined travel surface S. Thus, the operator can perceive a steering performance of the vehicle 10 that more closely corresponds to the operator's requested performance.

If the torque input by the rear wheels 14L, 14R is less than the braking torque applied to the front wheels 12L, 12R, then the operator's requested braking torque can correspond to a value at which the vehicle 10 will decelerate and/or come to a stop. In this state, the braking torque applied to the front wheels 12L, 12R can be greater than the drive torque input to the powertrain 30 by the rear wheels 14L, 14R. Since the powertrain 30 can rotational couple the rear wheels 14L, 14R to the front wheels 12L, 12R, the powertrain 30 can transfer the braking torque to all of the wheels 12L, 12R, 14L, 14R and the vehicle 10 will decelerate and/or come to a stop. Thus, the operator can perceive a braking performance of the vehicle 10 that more closely corresponds to the operator's requested performance.

The powertrain 30 can include one or more torque transmitting structure(s) that can be selectively engaged and disengaged such that the powertrain 30 is placed in the 4WD mode and the 2WD mode, respectively. The powertrain 30 can include a controller 60 that is configured with hardware, with or without software, to signal the torque transmitting structure(s) to selectively activate and deactivate operation in the 4WD mode. The controller 60 can be configured to activate the torque transmitting structure(s) to place the powertrain 30 in the 4WD mode when the vehicle 10 is reversing down the inclined travel surface S. The controller 60 can be configured to deactivate the torque transmitting structure(s) to place the powertrain 30 in the 2WD mode when the vehicle 10 is reversing down the inclined surface. The brake torque distribution system can be configured to automatically return the brake bias to the front wheels 12L, 12R by deactivating the 4WD mode of the powertrain 30. Details of the powertrain 30 and the braking system 40 are described below.

The powertrain 30 of FIG. 2 can be configured as a front-wheel-drive powertrain in which the front wheels 12L, 12R are normally the driven wheels when the powertrain 30 operates in the 2WD mode and the rear wheels 14L, 14R are selectively driven along with the front wheels 12L, 12R when the powertrain 30 operates in the 4WD mode. Thus, the 2WD mode can also be referred to as a front-wheel-drive ("FWD") mode and the 4WD mode can also be referred to as an all-wheel-drive ("AWD") mode. However, alternate embodiments can include a powertrain 30 that is configured as a rear-wheel-drive powertrain the rear wheels 14L, 14R are normally the driven wheels when the powertrain 30 operates in the 2WD mode and the front wheels 12L, 12R are selectively driven along with the rear wheels 14L, 14R when the powertrain 30 operates in the 4WD mode.

The powertrain 30 can include a power source 34, a transmission 36, a propeller shaft 38, the pair of front driveshafts 120L, 120R, the rear driveshafts 140L, 140R a power-take-off ("PTO") assembly 340, a front final drive assembly 360 and a rear final drive assembly 380.

The power source 34 can be a source of drive torque that can propel the vehicle along the travel surface S. The power source 34 can be an internal combustion engine, or an electric motor, or a hybrid of an internal combustion engine and an electric motor. The power source 34 can include an output shaft that is connected to and drives the transmission 36.

The transmission 36 can include an input shaft that is connected to and driven by the output shaft of the power source 34. The transmission 36 can be configured to multiply the torque output by the power source 34 in incremental steps or continuously between an upper torque limit and a lower torque limit. The transmission 36 can include a transmission output gear 32 that outputs the multiplied torque to the front final drive assembly 360 when the powertrain 30 is in the FWD mode and the AWD. The transmission output gear 32 can output the multiplied torque to the rear final drive assembly 380 when the powertrain 30 is in the AWD mode.

The front final drive assembly 360 can include a front final drive gear 362 that engages and is driven by the transmission output gear 32. The front final drive assembly 360 can include a front differential drive assembly that is driven by the front final drive gear 362 and is configured to output a differential torque to one or both of the front driveshafts 120L, 120R. The front differential drive assembly can be configured as an open-type differential drive assembly or a limited-slip-type differential drive assembly, or other appropriate assembly that can vary the torque output to each of the front driveshafts 120L, 120R. The front differential drive assembly can include a planetary gear assembly, a viscous coupling assembly, a friction clutch assembly, or any combination of these assemblies.

The PTO assembly 340 can include one or more torque transmitting structure(s) that can selectively convert the powertrain 30 between the FWD mode and the AWD mode, automatically, or in response to a direct input from the operator of the vehicle 10. When in the FWD mode, a substantial portion of the AWD mode components of the powertrain 30 can be rotationally isolated from the power source 34 and the rear wheels 14L, 14R of the vehicle 10 to maximize fuel economy by minimizing parasitic losses that can be caused by rotational inertia, friction, etc., of the components (if not isolated). For example, the propeller shaft 38, the rear final drive assembly 380 and at least a portion of the PTO assembly 340 can be disconnected from the transmission output gear 32 when the powertrain 30 is in the AWD mode.

The PTO assembly 340 can be connected to the front final drive assembly 360 such that the front final drive assembly 360 transfers the output torque from the transmission output gear 32 to the PTO assembly 340. The controller 60 can be configured to cause the PTO assembly 340 to selectively connect and disconnect the rear wheels 14L, 14R to the transmission output gear 32 based on one more dynamic conditions of the vehicle 10. The PTO assembly 340 can include one or more torque transmitting structures that can be located at any appropriate location between the transmission output gear 32 and at least one of the rear driveshafts 140L, 140R such that the torque transmitting structure(s) selectively couple and decouple the rear wheels 14L, 14R with the transmission output gear 32.

The PTO assembly 340 can include a PTO input gear 342, a PTO shaft 344, a PTO clutch 346, an intermediate gear 348 and a PTO output gear 350. The PTO input gear 342 can engage and be driven by the front final drive gear 362. The PTO clutch 346 can selectively transmit torque or disconnect torque transmission between the intermediate gear 348 and the PTO input gear 342. The intermediate gear 348 can engage and drive the PTO output gear 350.

The propeller shaft 38 can extend substantially parallel to a longitudinal direction L of the vehicle 10 from a front end of the propeller shaft 38 to the rear end of the propeller shaft 38. The front end can be connected to the PTO output gear 350 to rotate in unison with the PTO output gear 350 and the rear end can be connected to the rear final drive assembly 380. The PTO assembly 340 can selectively connect the transmission output gear 32 to the propeller shaft 38 based on whether the powertrain 30 is to be operated in the AWD mode or the FWD mode. Further, the PTO assembly 340 can transmit torque from the rear final drive assembly 380 to the front final drive assembly 360 when the vehicle 10 reverses down the inclined travel surface S and the powertrain operates in the AWD mode.

The rear final drive assembly 380 can include a pair of rear clutches 382L, 382R, a rear input gear 384, a rear final drive gear 386 and an intermediate shaft 388. The rear end of the propeller shaft 38 can be connected to and drive the rear input gear 384. The rear input gear 384 can engage and drive the rear final drive gear 386. The rear final drive gear 386 can be connected to and drive the intermediate shaft 388. The left rear clutch 382L can selectively couple the rear final drive gear 386 to the left rear driveshaft 140L. The right rear clutch 382R can selectively couple the intermediate shaft 388 to the right rear driveshaft 140R.

The PTO clutch 346 and the rear clutches 382L, 382R can be any appropriate structure such as but not limited to a friction plate clutch or a dog clutch. Each of the clutches 346, 382L, 382R can include an actuator that is in electrical communication with the controller 60. The controller 60 can be configured to operate the powertrain 30 in the AWD mode by transmitting an activation signal to each of the actuators that causes the actuators to engage the clutches 346, 382L, 382R so that the PTO clutch 346 can transmit torque between the intermediate gear 348 and the PTO input gear 342, the left rear clutch 382L can transmit torque between the rear final drive gear 386 and the left rear driveshaft 140L, and the right rear clutch 382R can transmit torque between the right rear driveshaft 140R and the intermediate shaft 388. The controller 60 can be configured to operate the powertrain 30 to the FWD mode by transmitting a deactivation signal to the actuators that causes the actuators to disengage the clutches 346, 382L, 382R so that the PTO clutch 346 disables the transfer of torque between the intermediate gear 348 and the PTO input gear 342, disables the transfer of torque between the rear final drive gear 386 and the left rear driveshaft 140L, and disables the transfer of torque between the right rear driveshaft 140R and the intermediate shaft 388.

The braking system 40 can include a brake pedal 42, a pressure source 44, a plurality of hydraulic brake lines 46, a pair of front brake assemblies 410L, 410R, a pair of rear brake assemblies 412L, 412R, a brake pedal sensor 420 and a brake pressure sensor 422. The hydraulic brake lines 46 can provided fluid communication between the pressure source 44 and the brake assemblies 410L, 410R, 412L, 412R. The braking system 40 can allow a driver to displace the brake pedal 42 to send a request to each of the brake assemblies 410L, 410R, 412L, 412R to apply a braking torque on the wheels 12L, 12R, 14L, 14R. The sensors 420, 422 can be in electrical communication with the controller 60.

The braking system 40 can be configured to selectively apply a first braking torque to each of the front wheels 12L, 12R and a second braking torque to each of the rear wheels 14L, 14R such that the braking system 40 decelerates the front wheels 12L, 12R and the rear wheels 14L, 14R when the braking system 40 applies the first braking torque to the front wheels 12L, 12R and the second braking torque to the rear wheels 14L, 14R. The braking system 40 can be configured as a front biased braking system such that the first braking torque applied by the braking system 40 is greater than the second braking torque. Thus, for a given input to the brake pedal 42, the first braking torque applied to the front wheels 12L, 12R can be greater than the second braking torque applied to the rear wheels 14L, 14R.

Each the brake assemblies 410L, 410R, 412L, 412R can include a caliper, at least one pad and a rotor. Each of the calipers can include at least one piston in fluid communication with a respective one of the hydraulic brake lines 46. The area of the face of the piston(s) in the calipers of the front brake assemblies 410L, 410R can be greater than the area of the face of the piston(s) in calipers of the rear brake assemblies 412L, 412R in order to provide a front brake bias for the brake system.

The pressure source 44 can include at least a master cylinder that is mechanically coupled to the brake pedal 42. Alternative embodiments can include a pressure source that includes a master cylinder and a modulator such as that used by an anti-lock brake system and/or a traction control system and/or a stability control system. The modulator can automatically apply a unique brake pressure to each of the brake assemblies 410L, 410R, 412L, 412R.

The vehicle 10 can include a gear selector 62 and the transmission 36 can include an actuator 64 that can select a respective gear ratio of the transmission 36 based on an input to the gear selector 62 by the operator of the vehicle 10. The gear selector 62 can be connected to the transmission 36, electrically, mechanically, hydraulically, or electro-mechanically, in any appropriate manner such that actuation of the gear selector 62 by the operator of the vehicle 10 can cause the transmission 36 to perform a shift event in which the actuator 64 shifts from one gear ratio to another gear ratio within the transmission 36. The gear selector 62 can be a mechanical lever or an electrical switch. The gear selector 62 can have a plurality of positions with a one-to-one correspondence to a plurality of gear ratios such as but not limited to park, reverse, drive, neutral, and one or more specific forward gear ratios. Alternatively, or additionally, the gear selector 62 can be movable in a sequential change mode in which movement of the gear selector 62 in a first direction causes the actuator 64 to perform an upshift event and in a second direction that causes the actuator 64 to perform a downshift event.

The controller 60 can be in electrical communication with the gear selector 62 and/or the actuator 64. The controller 60 can be configured to determine whether the vehicle 10 is traveling in a reverse direction based on a signal from the gear selector 62 and/or the actuator 64.

The vehicle 10 can include a speed sensor 620, an inclinometer 622 and a load sensor 624. The controller 60 can be in electrical communication with each of the sensors 620, 622, 624.

The speed sensor 620 can be a wheel speed sensor, a transmission speed sensor, or any other appropriate sensor that is configured to output data indicative of the traveling speed of the vehicle 10. FIG. 2 illustrates the speed sensor 620 configured to detect the rotational speed of the output shaft of the transmission 36.

Referring to FIG. 1, the inclinometer 622 can be any appropriate sensor configured to output data indicative of an angle between a longitudinal axis LA of the vehicle 10 and horizontal H. This angle can be the same as or approximated by the angle α at which the travel surface S is inclined relative to horizontal H. The angle of inclination of the vehicle 10 can be in degrees, percent, grade (slope), or any other appropriate unit of measurement.

The load sensor 624 can be any appropriate sensor that can output data that is indicative of the presence or absence of a load stowed in or on the vehicle 10 or otherwise transported by the vehicle 10. For example, the load sensor 624 can be a sensor that can detect the presence or absence of a wire harness connector for the trailer 22 that is electrically connected to a mating connector on the vehicle 10. Alternate embodiments of the load sensor 624 can include a sensor that can output data that is indicative of an amount of travel by a member of the suspension for each of the rear wheels that is caused by the static weight of the load 20.

Figure 3:
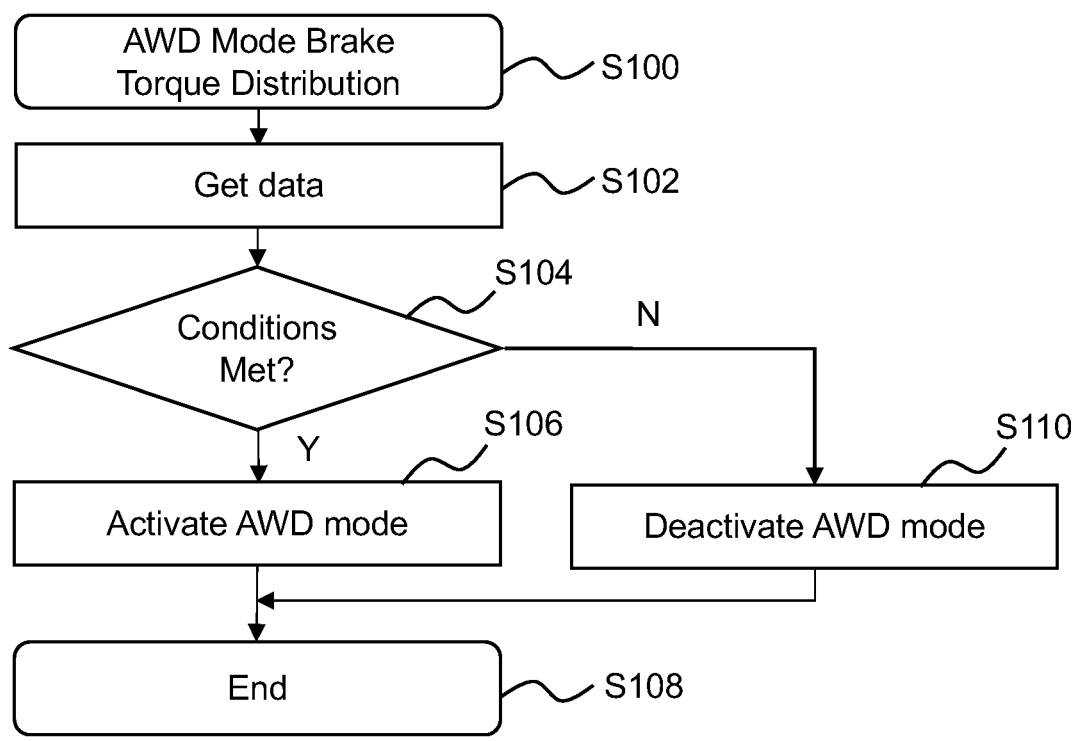
FIG. 3 is a flowchart depicting an exemplary algorithm useable by the brake torque distribution system of FIG. 2.

FIG. 3 illustrates an exemplary algorithm that the controller 60 can follow in order to use the AWD mode of the powertrain 30 to distribute to the rear wheels 14L 14R a braking torque applied by the braking system 40 to the front wheels 12L, 12R.

The controller 60 can begin the AWD mode brake torque distribution algorithm at step S100. Then, the controller 60 can proceed to step S102.

At step S102, the controller can obtain the data directly from the sensors 420, 422, 620, 622, 624, the gear selector 62 (or the actuator 64) or from data transmitted from these sources and stored in a memory device in electrical communication with the controller 60. The controller 60 can then proceed to step S104.

At step S104, the controller 60 can determine whether the brake torque distribution system can be beneficially based on one or more conditions of the vehicle 10. For example, activation of the brake force distribution system can be advantageous when each of following conditions occurs: engagement of the reverse gear ratio in the transmission 36; the longitudinal axis LA of the vehicle 10 is inclined at an angle α with respect to horizontal H, and the vehicle 10 is transporting the load 20 in the form of stowed cargo or the trailer 22 that is hitched to the vehicle 10.

At step S104, the controller 60 can be configured to compare the selected gear data from the either the gear selector 62 or the actuator 64 to the value that corresponds to gear data that is indicative of the reverse gear ratio.

At step S104, the controller 60 can be configured to compare the angle of inclination a to an inclination threshold. The inclination threshold can be any appropriate fixed predetermined value that provides the desired performance for the brake torque distribution system. Alternate embodiments can include an inclination threshold that varies as a function of vehicle speed or wheel speed.

The controller 60 can be configured to compare the load data output by the load sensor 624 to a load threshold. If the load data is indicative of a connection state between the wire harness connector of the trailer 22 and the mating connector on the vehicle 10, then the load threshold can correspond to a CONNECTED state. If the load data is indicative of suspension travel, then the load threshold can correspond to a value of suspension travel above which the brake torque distribution system can provide the desired performance.

If the controller 60 determines that the gear selector data corresponds to the reverse gear value, and the angle of inclination a is greater than the inclination threshold, and the load is equal to (or greater than) the load threshold, then the controller 60 can determine that the basic conditions of the vehicle 10 are suitable for the brake torque distribution system to be activated and the controller 60 can proceed to step S106. If the controller 60 determines that at least one of the base conditions of the vehicle of S104 is not met, then the controller 60 can determine that activation of the brake torque distribution system is not advantageous and the controller 60 can proceed to step S110 to deactivate the AWD mode, or maintain the deactivated state of the AWD mode if it is currently deactivated.

Alternate embodiments can include one or more additional conditions that the controller 60 checks during step S104 before the controller 60 activates the brake torque distribution system. For example, there is no brake torque to distribute if the operator does not input a braking torque request via the brake pedal 42 to the braking system 40. Thus, the controller 60 can be configured to determine the brake system status based on data from the brake pedal sensor 420 and/or the brake pressure sensor 422.

The controller 60 can be in electrical communication with the brake pedal sensor 420. The brake pedal sensor 420 can be configured to output data indicative of either an ON state or an OFF state. The brake pedal sensor 420 can be configured to output data that is indicative of the ON state in response to an operator's actuation of the brake pedal 42. The brake pedal sensor 420 can be configured to output data that is indicative of the OFF state when the operator does not apply an input to the brake pedal 42. The controller 60 can be configured to determine whether the data from the brake pedal sensor 420 corresponds to the ON state or the OFF state. If the controller 60 determines that vehicle 10 is traveling in reverse along an inclined travel surface, hauling a load, and the data from the brake pedal sensor 420 corresponds to the ON state, then the controller 60 can proceed to step S106. If any one of these conditions is not met, then the controller 60 can proceed to step S110.

Alternate embodiments can include a brake pedal sensor 420 that is configured to output data indicative of a stroke through which the operator moves the brake pedal 42. The data output by the brake pedal sensor 420 can be indicative of an angular displacement value or an arc length displacement value. The controller 60 can be configured to determine whether the data from the brake pedal sensor 420 exceeds a predetermined stroke threshold. If the controller 60 determines that vehicle 10 is traveling in reverse along an inclined travel surface, hauling a load, and the data from the brake pedal sensor exceeds the predetermined stroke threshold, then the controller 60 can proceed to step S106. If any one of these conditions is not met, then the controller 60 can proceed to step S110.

Alternate embodiments of the controller 60 can be configured to activate the brake torque distribution system based on a brake pressure value. The controller 60 can be in electrical communication with the brake pressure sensor 422. The brake pressure sensor 422 can be configured to output data that is indicative a hydraulic pressure that is output by the pressure source 44. The controller 60 can be configured to determine whether the data from the brake pressure sensor 422 exceeds a predetermined pressure threshold. If the controller 60 determines that vehicle 10 is traveling in reverse along an inclined travel surface, hauling a load, and the data from the brake pedal sensor exceeds the predetermined pressure threshold, then the controller 60 can proceed to step S106. If any one of these conditions is not met, then the controller 60 can proceed to step S110.

Alternate embodiments of the vehicle 10 can include an integrated dynamic system ("IDS") 66. The IDS 66 can be in electrical communication with any appropriate component or system of the vehicle 10 such as but not limited to the power source 34, the transmission 36, the steering system, and one or more components of the suspension for the wheels 12L, 12R, 14L, 14R. The IDS 66 can adjust parameters of the vehicle 10 such as but not limited to the engine map, transmission shift map, the damping rate of the suspension dampers, and/or the steering gear ratio. The IDS modes can include but are not limited to an economy mode, a normal mode, a tow mode, an off-road mode, a sport mode, and a sport plus mode. The IDS 66 can include an input device such as but not limited to a switch or a touch screen that allows the operator of the vehicle 10 to select one of a plurality of dynamic modes for the vehicle.

The brake torque distribution system can be advantageous for less than all modes of the IDS 66. For example, the brake torque distribution system can be advantageous for the tow mode and the normal mode, and might not be advantageous for the sport mode and the sport plus mode. Thus, it can be advantageous for the controller 60 to check the current IDS mode before activating the brake torque distribution system. The controller 60 can be configured for electrical communication with the IDS 66 and to obtain data from the IDS 66 that is indicative of the current mode of the IDS 66. The controller 60 can be configured to compare the current IDS mode with a predetermined subset of the IDS modes. If the controller 60 determines that vehicle 10 is traveling in reverse along an inclined travel surface, hauling a load, and the current IDS mode corresponds to any one of the predetermined subset of IDS modes, then the controller 60 can proceed to step S106. If any one of these conditions is not met, then the controller 60 can proceed to step S110.

At step S106, controller 60 can be configured to signal the PTO clutch 346 and the rear clutches 382L, 382R to move to the engaged position such that the powertrain 30 operates in AWD mode. Then, controller 60 can proceed to step S108 to end the all-wheel drive brake distribution algorithm.

When the vehicle reverses down the inclined travel surface S and the powertrain 30 operates in the AWD mode, the front wheels 12L, 12R and the rear wheels 14L, 14R can input a torque into the powertrain 30 if the transmission output gear 32 does not output a drive torque. Engaging the clutches 346, 382L, 382R during this torque input state can advantageously transfer to the rear wheels 14L, 14R the front biased brake torque that is applied by the braking system 40 to the front wheels 12L, 12R. Thus, the brake torque distribution system can transfer the front brake bias to the rear wheels 14L, 14R using the mechanical torque transmission pathway provided by the AWD mode of the powertrain 30 without adding specialized structure(s), weight and/or complexity to the vehicle 10. Alternatively, the brake torque distribution system can override the front brake bias with the torque input by the rear wheels 14L, 14R. Thus, the brake torque distribution system can enhance the operator's perceived performance of the vehicle 10 in based on the operator's braking and steering inputs without adding specialized structure(s), weight and/or complexity to the vehicle 10.

At step S110, the controller 60 can be configured to signal the PTO clutch 346 and the rear clutches 382L, 382R to move to the disengaged position such that the powertrain 30 operates in FWD mode. Then, controller 60 can proceed to step S108 to end the all-wheel drive brake distribution algorithm.

ALTERNATIVE EMBODIMENTS

While certain embodiments of the invention are described above, it should be understood that the invention can be embodied and configured in many different ways without departing from the spirit and scope of the invention.

For example, embodiments are disclosed above in the context of powertrain 30 of vehicle 10 shown in FIG. 2 that includes the PTO clutch 346 and the rear clutches 382L, 382R. However, alternate embodiments can omit the PTO clutch 346. Alternate embodiments can include the PTO clutch 346 and omit one or both the rear clutches 382L, 382R. Alternative embodiments can include the PTO clutch 346 located between the rear end of the propeller shaft 38 and the rear input gear 384 of the rear final drive assembly 380.

FIG. 2 illustrates a powertrain 30 that is configured as a front-wheel-drive powertrain with the rear wheels 14L, 14R selectively driven when the powertrain operates in the AWD mode. However, alternate embodiments can include a powertrain 30 that is configured as a rear-wheel-drive powertrain with the front wheels 12L, 12R selectively driven when the powertrain 30 operates in the AWD mode. In this alternate embodiment, the transmission 36 and the PTO assembly 340 can be reconfigured such that a transmission output shaft is connected to and drives a transfer case. The transfer case can be connected to and drive the propeller shaft 38 and can be selectively connected to and drive the front final drive assembly 360. In this alternate embodiment, the powertrain 30 can include a secondary propeller shaft that extends from and is connected to each of the transfer case assembly and the front final drive assembly 360.

Embodiments are disclosed above in the context of powertrain 30 of vehicle 10 that is configured as a part-time AWD powertrain. However, alternate embodiments can include a powertrain 30 that is configured as a full-time 4WD powertrain that can vary the torque distribution between the front axle and the rear axle with a center coupling such as but not limited to a viscous coupling or a differential gear assembly based on the traction available at each of the wheels 12L, 12R, 14L, 14R. The controller 60 can be configured to lock the center coupling when the vehicle 10 reverses down the inclined surface S with the load 20.

The controller 60 can be referred to as an electronic control unit (ECU) or as a central processing unit (CPU). Embodiments of the controller 60 are intended to include any known, related art or later developed technologies. The controller 60 can include an internal memory device or can be in electrical communication with an external memory device. The memory device can be any appropriate memory device such as but not limited to a RAM device, a ROM device, or an EEPROM device. The controller 60 also can be referred to as an AWD ECU.

Alternate embodiments of the braking system 40 can include a brake controller that is configured to signal the modulator of the pressure source 44 in accordance with wheel speed data and brake pressure request data. The brake controller can be referred to as an anti-lock brake system ("ABS") controller, or as an ABS ECU, or as an ABS CPU. The ABS ECU can be in electrical communication with the brake pedal sensor 420, the brake pressure sensor 422, the pressure source 40 and each of a plurality of wheel speed sensors associated with a respective one the wheels 12L, 12R, 14L, 14R. In this alternate embodiment, the controller 60 can be in electrical communication with the ABS ECU. The ABS ECU can be configured to transmit the data from the sensors 420, 422 to the controller 60 and the controller 60 can be configured to receive the sensor data from the ABS ECU instead of being in direct electrical communication with the sensors 420, 422. However, alternate embodiments can include a single controller that is configured to perform the operations of the controller 60 and the ABS ECU, or can include multiple controllers (e.g, an ABS ECU and an AWD ECU) located at different positions on the vehicle and that relay signals between each other.

Alternate embodiments of the AWD mode brake torque distribution algorithm can include one more additional steps that rely on steering data in order to activate or deactivate the AWD mode. For example, the algorithm can be modified to cause the controller 60 to obtain steering angle data indicative of a steering input by the driver to a steering wheel of the vehicle 10. The algorithm can include steps that cause the controller 60 to compare the steering angle data to a predetermined threshold angle and deactivate the AWD mode if the steering angle data does not correspond to the threshold angle. The predetermined threshold angle can be a single value or a range of values at which the AWD mode provides an advantageous performance for the vehicle 10.

Electrical communication lines shown in phantom is FIG. 2 can connect the controller 60 to the transmission 36, the gear selector 62, the actuator 64, the IDS 66, the clutches 346, 382L, 382R and the sensors 420, 422, 620, 622, 624 in any appropriate manner. Electrical communication can be either one-way communication or two-way communication and can be networked or not networked. Alternate embodiments can include wireless communication between the controller 60 and any of these electrical/electronic devices.

Any sensor(s) constituting a component(s) of the brake torque distribution system or can be configured with hardware, with or without software, to perform the assigned task(s). The sensors can be configured as smart sensors, such that the sensors can process the raw data collected by the sensors prior to transmission to the controller 60. Alternatively, the sensors can be configured as simple sensors that pass the raw data directly to the controller 60 without any manipulation of the raw data. The sensors can be configured to send data to the controller 60, with or without a prompt from the controller 60.

Alternate embodiments of the vehicle 10 can include a speed sensor 620 associated with a respective one of the wheels 12L, 12R, 14L, 14R. Each of the speed sensors 620 can be configured to output data indicative of a rotational velocity of the respective one of the wheels 12L, 12R, 14L, 14R. The speed sensors 620 can be mounted on an appropriate portion of the vehicle 10 to detect rotation of the respective rear wheel 14L, 14R (or the respective rear driveshaft 140L, 140R) in any appropriate manner. The raw data from the speed sensors 620 can be processed by the speed sensors 620 or by the controller 60 to indicate a rotational velocity of the respective wheels 12L, 12R, 14L, 14R. The speed sensors 620 can be any type of sensor capable of providing the appropriate data. The controller 60 can be configured to use the data from only one of the speed sensors 620 or determine an average value based on data from at least two of the speed sensors 620.

Alternatively, instead of with the controller 60, the speed sensor 620 can be in electrical communication with an additional controller (not illustrated) that is different from the controller 60. This additional controller can be in electrical communication with the controller 60. This additional controller can be utilized to affect a different control system of the vehicle 10, such as, but not limited to, an anti-lock brake system, a traction control system and/or a vehicle stability control system. This additional controller can be configured to receive processed data from the speed sensors 620 or to receive the raw data from the speed sensors 620 and process the raw data to indicate a rotational velocity of the respective wheels 12L, 12R, 14L, 14R. Then, this additional controller can electrically communicate the processed data to the controller 60.

The braking system 40 can be configured with as mechanically actuated braking system as shown in FIG. 2. Alternate embodiments can include the braking system 40 configured as a brake-by-wire system in which the brake pedal 42 is electrically connected to the pressure source 44 and/or to each of the brake assemblies 410L, 410R, 412L, 412R. The brake assemblies 410L, 410R, 412L, 412R can include an electrically powered actuator that causes a the brake assemblies 410L, 410R, 412L, 412R to apply a brake torque to the respective one of the wheels 12L, 12R, 14L, 14R.

The power source 34 can have the engine output axis oriented in the longitudinal direction L or in the traverse direction T of the vehicle 10. The power source 34 can be mounted forward of the front axle, rearward of the rear axle, or intermediate the front and rear axles. In FIG. 2, the power source 34 is configured as a traversely-oriented front-mounted internal combustion engine.

The transmission 36 can be an automatic transmission, a manual transmission, or a semi-automatic transmission. The transmission 36 can include an input shaft, an output shaft, and a speed ratio assembly. The transmission output gear 32 can be mounted on the output shaft. The speed ratio assembly can connect the output shaft to the input shaft. A coupling can connect the output shaft of the power source 34 to the input shaft of the transmission 36. The coupling can permit selective engagement/disengagement of the input shaft with the engine output shaft, or at least relative rotation of the engine output shaft with respect to the input shaft, in any manner known in the art. Exemplary couplings can include, but are not limited to, a friction disc clutch and a torque converter.

The gear selector 62 can be connected to the transmission 36, electrically, mechanically, or electro-mechanically, in accordance with any known, related art or later developed configuration, such that actuation of the gear selector 62 by the operator can effect a shift from one gear ratio to another gear ratio within the transmission 36. The gear selector 62 can be a mechanical lever or an electrical switch. The gear selector 62 can be mounted in any one of a plurality of different locations within the vehicle, including but not limited to, at the center console, at the steering column, at the steering wheel, and at the instrument panel.

What is claimed is:

1. A brake torque distribution system for a vehicle having a pair of front wheels, a pair of rear wheels, and a powertrain configured to selectively drive either the front wheels or the rear wheels in a two-wheel drive mode and selectively drive all of the front wheels and the rear wheels in an all-wheel drive mode, the powertrain including a reverse gear ratio and a clutch having an engaged position and a disengaged position, and the powertrain operating in the two-wheel drive mode when the clutch is in the disengaged position and operating in the all-wheel drive mode when the clutch is in the engaged position, the brake torque distribution system comprising:

a braking system configured to selectively apply a braking torque to each of the front wheels and the rear wheels that decelerates rotation of the front wheels and the rear wheels in response to a braking request received by the braking system; and a controller in electrical communication with the braking system and the clutch, and configured to signal the clutch to move to the engaged position such that the front wheels are rotationally coupled to the rear wheels and the brake torque applied to the front wheels by the braking system is transmitted to the rear wheels, and the controller is configured to signal the clutch to move to the engaged position based on, an inclination angle signal received by the controller and indicative of an angle of inclination of the vehicle, a selected gear signal received by the controller that is indicative of the reverse gear ratio being selected in the powertrain, and a load signal received by the controller and indicative of a load applied to a portion of the vehicle adjacent to the rear wheels.

2. The brake torque distribution system according to claim 1 wherein the controller is configured to signal the clutch to move to the engaged position based on,
the inclination angle signal,
the selected gear signal,
the load signal, and
a brake input signal received by the controller and indicative of the braking request received by the braking system.

3. The brake torque distribution system according to claim 2, wherein
the brake input signal includes data indicative of a brake pressure request, and
the controller is configured to signal the clutch to move to the engaged position based on, the inclination angle signal,
the selected gear signal,
the load signal, and
the brake input signal being greater than a predetermined brake pressure.

4. The brake torque distribution system according to claim 2, wherein
the brake input signal includes data indicative of a position of a switch, and the controller is configured to signal the clutch to move to the engaged position based on,
the inclination angle signal,
the selected gear signal,
the load signal, and
the brake input signal corresponding to a predetermined position of the switch.

5. The brake torque distribution system according to claim 1, wherein the controller is configured to signal the clutch to move to the engaged position based on,
the selected gear signal,
the load signal, and
the inclination angle signal corresponding to a surface grade that is greater than a predetermined grade threshold.

6. The brake torque distribution system according to claim 1, wherein
the controller is configured to determine a surface grade threshold based on a speed of the vehicle, and
the controller is configured to signal the clutch to move to the engaged position based on,
the selected gear signal,
the load signal, and
the inclination angle signal corresponding to a surface grade that is greater than the surface grade threshold.

7. The brake torque distribution system according to claim 1, wherein the controller is configured to signal the clutch to move to the engaged position based on,
the inclination angle signal,
the selected gear signal, and
a vehicle dynamics setting signal received by the controller and indicative of a selected one of a plurality of vehicle dynamic performance modes.

8. The brake torque distribution system according to claim 1 wherein
the controller is configured to compare the load signal to a predetermined load threshold, and
the controller is configured to signal the clutch to move to the engaged position based on,
the selected gear signal,
the inclination angle signal, and
the load signal being greater than the load threshold.

9. A vehicle comprising:
a pair of front wheels;
a pair of rear wheels;
a powertrain configured to selectively drive either the front wheels or the rear wheels in a two-wheel drive mode and selectively drive all of the front wheels and the rear wheels in an all-wheel drive mode, the powertrain including,
a clutch having a disengaged position and an engaged position, the powertrain operating in the two-wheel drive mode when the clutch is in the disengaged position, and the powertrain operating in the all-wheel drive mode when the clutch is in the engaged position;
a braking system connected to each of the front wheels and the rear wheels and configured to selectively apply a first braking torque to each of the front wheels and a second braking torque to each of the rear wheels such that the braking system decelerates the front wheels and the rear wheels when the braking system applies the first braking torque to the front wheels and the second braking torque to the rear wheels; and
a controller configured to signal the clutch to move to the engaged position in response to the vehicle reversing down an incline and the braking system applying the first braking torque to the front wheels and the second braking torque to the rear wheels such that the clutch rotationally couples the pair of rear wheels to the pair of front wheels and transmits to the rear wheels the first braking torque.

10. The vehicle according to claim 9, wherein the first braking torque is greater than the second braking torque.

11. The vehicle according to claim 9, wherein the powertrain further includes,
a power source configured to output a torque, and
a transmission selectively driven by the torque output by the power source and configured to,
multiply the torque output by the power source, and
selectively output a forward drive torque and a reverse drive torque as a multiple of the torque output by the power source.

12. The vehicle according to claim 9, wherein the powertrain further includes,
a front final drive assembly connected to the pair of front wheels;
a rear final drive assembly connected to the pair of rear wheels;
a propeller shaft connected to the rear final drive assembly, wherein
the clutch selectively connects the front final drive assembly to the propeller shaft.

13. The vehicle according to claim 9, wherein the powertrain further includes,
a front final drive assembly connected to the pair of front wheels;
a propeller shaft connected to the front final drive assembly;
a rear final drive assembly connected to the propeller shaft, wherein
the clutch selectively connects at least one of the rear wheels to the rear final drive assembly.

14. A method for using an all-wheel drive mode of a powertrain for a vehicle to distribute a braking torque applied by a braking system of the vehicle, the vehicle powertrain including a clutch configured to selectively activate and deactivate the all-wheel drive mode, the method comprising:

obtaining an inclination angle of the vehicle and a direction of travel of the vehicle;

determining whether a load is applied to a portion of the vehicle that is adjacent to a rear wheel of the vehicle; and signaling the clutch to activate the all-wheel drive mode when the vehicle is reversing down an incline and the load is equal to or greater than a predetermined load threshold.

15. The method according to claim 14, further comprising:

monitoring a selected gear ratio of a transmission of the vehicle; and determining the vehicle is reversing down the incline when a reverse gear ratio is selected and the inclination angle is greater than a predetermined threshold.

16. The method according to claim 14, further comprising:

monitoring the braking system for a braking input to the braking system, wherein the signaling the clutch includes signaling the clutch to activate the all-wheel drive mode in response to receipt of the braking input when the vehicle is reversing down the incline and the load is equal to or greater than the predetermined load threshold.

17. The method according to claim 16, further comprising:

obtaining a selected vehicle dynamic performance mode, wherein the signaling the clutch includes signaling the clutch to activate the all-wheel drive mode in response to receipt of the braking input when the vehicle is reversing down the incline, the load is equal to or greater than the predetermined load threshold, and the selected vehicle dynamics mode corresponds to at least one of a plurality of predetermined vehicle dynamic performance modes.

18. The method according to claim 16, wherein the braking input corresponds to one of, a brake pressure of the braking system is greater than a predetermined pressure, a switch of the braking system is activated, and a pedal of the braking system is moved to a predetermined position.

19. The method according to claim 18, wherein the signaling the clutch includes signaling the clutch to deactivate the all-wheel drive mode when the braking input terminates.

20. The method according to claim 14, further comprising:

obtaining a current speed of the vehicle, determining a grade threshold based on the speed of the vehicle, and signaling the clutch to activate the all-wheel drive mode in response to receipt of a braking input while the vehicle is reversing down the incline, the load is equal to or greater than the predetermined load threshold, and the inclination angle is greater than the grade threshold.

* * * * *